US012088713B2

(12) United States Patent
Beveridge et al.

(10) Patent No.: US 12,088,713 B2
(45) Date of Patent: Sep. 10, 2024

(54) DYNAMIC SELECTION AND CALIBRATION OF CIPHERS BASED ON NETWORK AND RESOURCE CONSTRAINTS

(71) Applicant: VMware LLC, Palo Alto, CA (US)

(72) Inventors: Daniel James Beveridge, Apollo Beach, FL (US); Mark Benson, Workingham (GB); Marc Wayne Brotherson, Boulder, CO (US); Sean Huntley, NSW (AU); Akeem Jenkins, Broomfield, CO (US); David Ott, Chandler, AZ (US)

(73) Assignee: VMware LLC, Palo Alto, CA (US)

( * ) Notice: Subject to any disclaimer, the term of this patent is extended or adjusted under 35 U.S.C. 154(b) by 230 days.

(21) Appl. No.: 17/385,287

(22) Filed: Jul. 26, 2021

(65) Prior Publication Data

US 2023/0026253 A1    Jan. 26, 2023

(51) Int. Cl.
*H04L 9/14* (2006.01)
(52) U.S. Cl.
CPC ..................... *H04L 9/14* (2013.01)
(58) Field of Classification Search
CPC .......................................................... H04L 9/14
See application file for complete search history.

(56) References Cited

U.S. PATENT DOCUMENTS

| 9,946,884 B2 * | 4/2018 | Antipa ................ G06F 21/606 |
| 10,291,589 B1 | 5/2019 | Sharifi Mehr |
| 11,153,075 B2 | 10/2021 | Nikitas et al. |
| 2010/0281270 A1 * | 11/2010 | Miyazaki ................ G06F 21/72 713/189 |
| 2011/0185178 A1 * | 7/2011 | Gotthardt .............. H04L 9/3263 713/172 |
| 2012/0072721 A1 | 3/2012 | Rescorla |
| 2012/0131354 A1 | 5/2012 | French |
| 2012/0275598 A1 * | 11/2012 | Vimpari ................ H04L 9/0872 380/255 |

(Continued)

FOREIGN PATENT DOCUMENTS

WO    2020106973 A1    5/2020

OTHER PUBLICATIONS

International Search Report/ Written Opinion issued to PCT/US2022/045578 on Feb. 16, 2023.

(Continued)

*Primary Examiner* — Abiy Getachew
(74) *Attorney, Agent, or Firm* — King Intellectual Asset Management (57) ABSTRACT

The disclosure provides an approach for cryptographic agility. Embodiments include receiving a request from an application for a cryptographic operation, wherein the request is associated with a computing device. Embodiments include determining one or more resource constraints related to the computing device. Embodiments include selecting, based on the one or more resource constraints, a cryptographic technique from a plurality of cryptographic techniques associated with indications of resource requirements. Embodiments include performing the cryptographic operation using the cryptographic technique. Embodiments include providing a response to the application based on performing the cryptographic operation.

20 Claims, 5 Drawing Sheets

(56) References Cited

U.S. PATENT DOCUMENTS

| | | |
|---|---|---|
| 2015/0139424 A1* | 5/2015 | Campagna ............ H04L 9/0866 |
| | | 380/270 |
| 2017/0006064 A1 | 1/2017 | Agarwal et al. |
| 2017/0093585 A1 | 3/2017 | Lee |
| 2019/0273728 A1 | 9/2019 | Sharifi Mehr |
| 2020/0186507 A1* | 6/2020 | Dhanabalan ........ H04L 63/0272 |
| 2023/0026560 A1 | 1/2023 | Brotherson et al. |

OTHER PUBLICATIONS

International Search Report/ Written Opinion issued to PCT/US2022/045588 on Feb. 17, 2023.

* cited by examiner

DYNAMIC SELECTION AND CALIBRATION OF CIPHERS BASED ON NETWORK AND RESOURCE CONSTRAINTS

BACKGROUND

Cryptography generally involves techniques for protecting data from unauthorized access. For example, data transmitted over a network may be encrypted in order to protect the data from being accessed by unauthorized parties. For example, even if the encrypted data is obtained by an unauthorized party, if the unauthorized party cannot decrypt the encrypted data, then the unauthorized party cannot access the underlying data. There are many types of cryptographic algorithms, and these algorithms vary in many aspects such as key size, ciphertext size, memory requirements, computation requirements, amenability to hardware acceleration, failure handling, entropy requirements, and the like. Key size refers to the number of bits in a key used by a cryptographic algorithm. Ciphertext size refers to the number of bits in the output from a cryptographic algorithm, which may be the same as the number of bits of the input or may include padding to produce a larger number of bits than the input. Memory requirements and computation requirements generally refer to the amount of memory and processing resources required to perform an algorithm. Amenability to hardware acceleration generally refers to whether an algorithm requires or can be improved through the use of a hardware accelerator. For example, a compute accelerator is an additional hardware or software processing component that processes data faster than a central processing unit (CPU) of the computer. Failure handling refers to the processes by which an algorithm accounts for failures, such as recovering keys that are lost or deactivated. Entropy requirements generally refer to the amount of randomness required by an algorithm, such as an extent to which randomly generated values are used as part of the algorithm (e.g., which generally improves security of the algorithm).

Some cryptographic algorithms may result in a higher level of security (e.g., having more bits of security, more layers of security, larger amounts of entropy, and/or the like) than others, and there may be trade-offs with respect to resource requirements such that higher-security algorithms may require larger amounts of storage, processing, and/or communication resources (e.g., involving the transmission of larger amounts of information over a network). Furthermore, new cryptographic algorithms and libraries are developed on an ongoing basis to meet changing security needs. Cryptographic libraries are collections of cryptographic algorithms that can be invoked, such as through calls to application programming interface (API) functions provided by the libraries, in order to perform various cryptographic functions (e.g., encryption of data, establishing secure connection channels, and/or the like). In some cases, weaknesses in particular algorithms may be discovered over time such as due to advances in computing technology (e.g., a particular algorithm may be susceptible to being compromised through the use of computing devices with more power than the computing devices that were in use at the time the algorithm was developed). For example, algorithms may become problematic and/or become less useful for a variety of reasons, such as due to algorithmic compromise (e.g., a weakness in the algorithm may be discovered and/or exploited), compute performance increases (e.g., the time required to "guess correctly" may be reduced), and/or the like. In some cases, new and/or updated algorithms may be developed to address these issues (e.g., by adding additional bits of security, additional layers of security, more complex forms of encryption, and/or the like).

The rise of quantum computing has raised the possibility of additional issues related to cryptography. For example, the high levels of computational power provided by quantum computing may enable nefarious actors to more easily access data secured with existing cryptographic algorithms, thereby gaining access to sensitive data that was previously believed to be secure.

The dynamic nature of computing technology and the variety of threats that exist to data security necessitate a continuous adapting of cryptography to meet these new circumstances and threats. Furthermore, laws and/or regulations may require certain types of cryptography to be utilized in certain contexts. Thus, compliance with such laws and/or regulations may further necessitate adopting of new and/or different types of cryptographic algorithms.

Conventional software applications are generally designed to implement and/or utilize particular cryptographic algorithms. These algorithms may be customizable in certain respects, but there is generally no convenient mechanism for changing the cryptographic algorithms utilized by an application without modifying the base code of the application, essentially requiring portions of the application code to be rewritten, which is time consuming and difficult. Such code modifications are expensive and error-prone, particularly when done on a regular basis to address the ever-changing landscape of computing security.

As such, there is a need for improved cryptography techniques that allow for cryptographic agility.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure relates to cryptographic agility. In particular, the present disclosure provides an approach for dynamically selecting and configuring ciphers based on network and resource constraints.

Cryptographic agility generally refers to techniques for dynamic selection and/or configuration of cryptographic algorithms. According to certain embodiments, logic related to selection and/or configuration of cryptographic algorithms is decoupled from the applications that utilize cryptographic functionality, and is implemented in one or more separate components. Thus, rather than an application directly calling a cryptographic library to perform cryptographic functionality, the application may call generic cryptographic functions provided by a separate cryptographic agility system, and the cryptographic agility system may then select and/or configure cryptographic algorithms, such as based on contextual information and/or policies. For instance, the cryptographic agility system may dynamically determine which libraries, algorithms, configuration values, and/or the like to select based on factors such as the type of data being encrypted, the type of application requesting encryption, the network environment(s) in which the data is to be sent, a destination to which encrypted data is to be sent, geographic locations associated with a source and/or destination of the data, attributes of users associated with the encryption, regulatory environments related to the encryption, network conditions, resource availability, performance constraints, device capabilities, and/or the like.

For example, policies may be defined by users (e.g., administrators), and may specify rules for selecting and/or configuring cryptographic algorithms. In one example, cryptographic techniques (e.g., algorithms and/or configurations of algorithms) are tagged with different levels of security (e.g., rated from 0-10), and a policy associated with an application may specify that all data that is to be transmitted from the application to a destination in a given type of networking environment, such as a public network, is to be encrypted using a high-security algorithm (e.g., rated 8 or higher). Thus, if the application calls a function provided by the cryptographic agility system to encrypt an item of data, and contextual information indicates that the data is to be transmitted to a device on a public network, then the cryptographic agility system, in certain embodiments, will select a cryptographic algorithm tagged as a high-security algorithm, such as with a security rating of 8 or higher.

By decoupling cryptographic logic from applications that rely on cryptographic functionality, cryptographic agility techniques described herein provide flexibility and extensibility, thus allowing cryptographic algorithms to be continually updated, changed, and otherwise configured without requiring modifications to the applications themselves. Accordingly, changing circumstances and new threats may be addressed in a dynamic and efficient manner, and computing security may thereby be improved.

According to embodiments of the present disclosure, cryptographic techniques are dynamically selected and/or configured based on network and/or resource constraints. In some cases, a cryptographic algorithm may be referred to as a "cipher". Cryptographic algorithms have varying resource requirements, such as different memory, processing, and/or communication resource requirements. For example, some algorithms are more computationally-intensive than others and some algorithms involve storage and/or transmission of larger amounts of data than others. For example, algorithms involving larger key sizes or ciphertext sizes generally require larger amounts of memory and/or network communication resources than algorithms with smaller key sizes or ciphertext sizes. In another example, the larger the number of bits of security used in an algorithm, the more processing-intensive the algorithm will generally be.

In a cryptographic agility system, an initial stage of selecting a cryptographic technique may involve ensuring that the security requirements for a given cryptographic operation, such as a level of security required by policy and/or context information, are met. However, there may be multiple algorithms and/or configurations of algorithms that meet these requirements. Thus, techniques described herein involve factoring resource-related considerations into the determination of which algorithms and/or configurations to use, such as based on device and/or network performance metrics and/or capability information.

Cryptographic algorithms and/or configurations of algorithms may be tagged based on resource requirements, such as by an administrator. For example, a given algorithm or configuration of an algorithm may be tagged with a classification with respect to each of memory requirements, processing requirements, network resource requirements, and/or the like. Classifications may take a variety of forms, such as high, medium, and low, numerical scales (e.g., 0-10), and/or the like. In some embodiments, rather than individual algorithms or configurations being tagged, types of algorithms and/or configurations are tagged with classifications relating to various types of resource requirements. For example, a tag may indicate that all algorithms that involve the use of an accelerator are associated with a high processing resource requirement. An accelerator is a hardware device or a software program that enhances the overall performance of a computer, such as by processing data faster than a central processing unit (CPU) of the computer (e.g., which may be referred to as a compute accelerator). Furthermore, cryptographic algorithms and/or configurations of algorithms may be tagged with indications of capability requirements, such as whether an accelerator is required.

When a cryptographic request is submitted by an application, the cryptographic agility system may gather information related to resource conditions and/or capabilities of the network and/or devices related to the cryptographic request. For instance, the cryptographic agility system may gather current resource availability (e.g., based on capacity and utilization), performance metrics, capability information, and the like for the device and/or network from which the request is received. Techniques for gathering such information are known in the art and may involve, for example, including contextual information in the cryptographic request, communication with one or more performance monitoring components, and/or the like.

Thus, the cryptographic agility system may select algorithms and/or configurations of algorithms that are best suited to the resource availability, performance, and/or capabilities of the device and/or network associated with the request. For example, if processing resource availability at a device is low (e.g., if processor utilization is high), then ciphers with low processing requirements may be selected. In another example, if network latency is high (e.g., for a satellite-based network) or if memory availability is low, then ciphers with smaller key sizes or ciphertext sizes may be selected in order to reduce the amount of data that will need to be stored and/or transmitted over the network to implement the cryptographic algorithm.

In some cases, cryptographic algorithms and/or configurations of algorithms may be dynamically switched over time based on changing circumstances. For example, if a device moves from a low-latency network to a high-latency network (such as the latency of a network that device is coupled to changes), the cryptographic agility system may switch from a cryptographic algorithm that requires a large amount of network resources to an alternative cryptographic algorithm that requires smaller amounts of network resources (e.g., a lower security algorithm that still meets the security requirements for the cryptographic operation), and may switch back if the device moves again into a lower-latency network.

In some cases, multiple cryptographic algorithms and/or configurations of algorithms may be used to service a single cryptographic request. For instance, if a new, more secure cryptographic algorithm has recently become available but is not yet certified by a particular organization, and a particular cryptographic request requires cryptography that is certified by the particular organization, a certified algorithm may first be used and then the new algorithm may be used on top of the certified algorithm to provide the added level of security.

Resource constraints generally refer to availability and/or capacity of various types of computing resources. Resource constraints may include hardware resource constraints, which are constraints that are dictated by the hardware capabilities/availability of the device, such as total memory, memory available for use (e.g., not being used), total computing resources, computing resources available for use, total network bandwidth, network bandwidth available for use, and/or the like. Resource constraints may also include software resource constraints, such as constraints that are dictated by which applications, operating systems, and/or the like are installed on a computing device. Device capabilities generally refer to the types of operations that a computing device is capable of performing, such as based on which hardware and/or software components are associated with the computing device. It is noted that while "device capabilities" are sometimes described separately from resource constraints, resource constraints may be based on device capabilities. For example, device capabilities may include whether a computing device is associated with a hardware accelerator. As such, a resource constraint of the computing device may include whether the computing device is capable of performing accelerator functionality, which may be based on whether the computing device is associated with a hardware accelerator.

As such, embodiments of the present disclosure improve upon conventional cryptography techniques in which cryptographic algorithms are pre-determined for applications (e.g., at design time) by allowing cryptographic algorithms and/or configurations to be dynamically selected and changed over time based on contextual information. For example, by selecting cryptographic algorithms and/or configurations based on network and/or resource constraints, techniques described herein improve the functioning of devices and networks on which cryptographic operations are performed by ensuring that cryptographic operations do not burden devices or networks beyond their capacity or capabilities. Furthermore, embodiments of the present disclosure improve information security by ensuring that the most secure and updated cryptographic techniques that are consistent with device and network constraints may be utilized by an application, even if such techniques were not available at the time the application was developed.

Additionally, techniques described herein may facilitate an organization's use of uniform policy configuration (e.g., a suite of coordinated policies), such as to orchestrate cryptographic usage across many hosts (e.g., for federated data centers deployed worldwide). Embodiments of the present disclosure may also be used to facilitate migration to new cryptographic algorithms at scale and/or to remove deprecated cryptographic algorithms from use in a centralized and coordinated manner.

Figure 1:
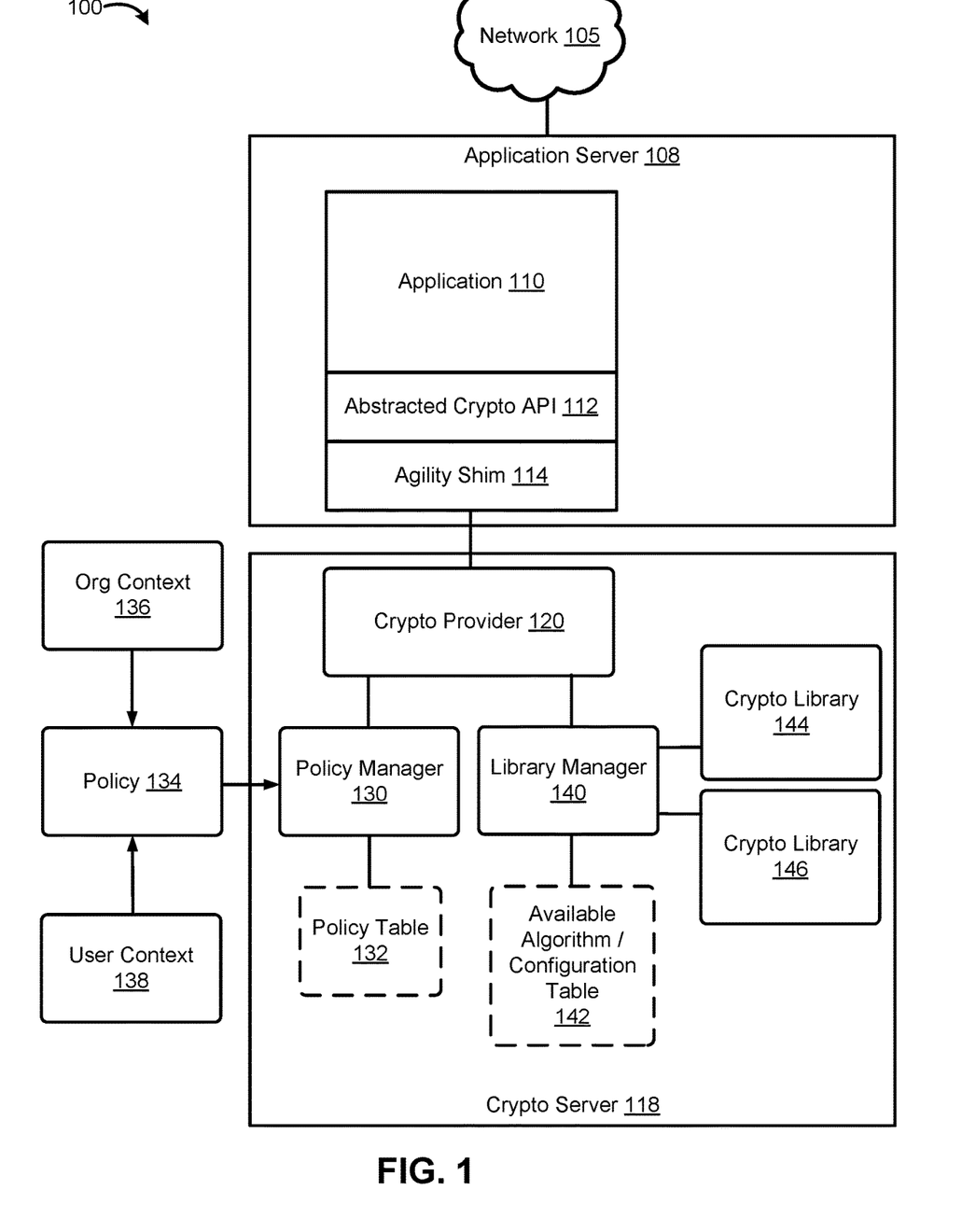
FIG. 1 is an illustration of example computing components related to cryptographic agility, according to embodiments of the present disclosure.

FIG. 1 is an illustration 100 of example computing components related to cryptographic agility, according to embodiments of the present disclosure.

An application server 108 is connected to a network 105. In certain embodiments, application server 108 may be a physical or virtual computing device, such as a server computer, that hosts an application 110. In some embodiments, application server 108 may be a virtual computing instance (VCI), such as a virtual machine (VM) or container that runs on a physical host computer. Network 105 may be any sort of network over which data may be transmitted, such as a local area network (LAN), cellular network, satellite-based network, the Internet, or the like. It is noted that application server 108 is included as an example computing device on which application 110 and/or associated components may be located, and other types of devices may also be used.

Application 110 generally represents a software application that requires cryptographic functionality. For example, application 110 may rely on cryptographic functionality to encrypt data that it transmits over a network (e.g., network 105), such as to one or more client devices that interact with application 110 (e.g., accessing content provided by application 110). While conventional techniques generally involve direct integration of cryptographic libraries with applications that rely on cryptographic functionality, techniques described herein involve abstracting cryptographic functionality away from applications. As such, an agility shim 114 provides an abstracted crypto application programming interface (API) 112 as a means of interaction between application 110 and a separate cryptographic agility system. Application 110 may call generic cryptographic functions of abstracted crypto API 112 in order to invoke particular cryptographic functionality, and the cryptographic agility system may select cryptographic techniques and perform cryptographic operations in response to the function invocations based on contextual information. Thus, application 110 may be merely a consumer of cryptography provided by the separate cryptographic agility system, rather than implementing cryptography itself.

The cryptographic agility system includes agility shim 114 and abstracted crypto API 112 as well as crypto provider 120, policy manager 130, and library manager 140. In some embodiments, while depicted as separate components, agility shim 114, abstracted crypto API 112, policy manager 130, and/or library manager 140 may be part of crypto provider 120. In certain embodiments, abstracted crypto API 112 and/or agility shim 114 are part of application 110. In alternative embodiments, abstracted crypto API 112 and/or agility shim 114 may be located on a separate device from application server 108, such as on crypto server 118 or a different computing device.

Agility shim 114 may comprise a library, and generally intercepts API calls (e.g., calls to functions of abstracted crypto API 112) and redirects them to crypto provider 120. Shims generally allow new software components to be integrated with existing software components by intercepting, modifying, and/or redirecting communications. As such, agility shim 114 allows application 110 to interact with crypto provider 120 even though application 110 may have no knowledge of crypto provider 120. For instance, application 110 may make generic function cryptographic function calls (e.g., requesting that an item of data be encrypted), and these generic function calls may be intercepted by agility shim 114 and redirected to crypto provider 120.

It is noted that while embodiments of the present disclosure are depicted on application server 108 and crypto server 118, alternative embodiments may involve various components being located on more or fewer computing devices. In some cases, aspects of the cryptographic agility system may be implemented in a distributed fashion across a plurality of computing devices. In certain embodiments, said components may be located on a single computing device.

In certain embodiments, crypto server 118 comprises a physical or virtual computing device, such as a server computer, on which components of the cryptographic agility system, such as crypto provider 120, policy manager 130, and/or library manager 140, reside. For example, crypto server 118 may represent a VCI or a physical computing device. Crypto server 118 may be connected to network 105 and/or one or more additional networks.

Crypto provider 120 generally performs operations related to dynamically selecting cryptographic techniques (e.g., based on contextual information related to requests for cryptographic operations), performing the requested cryptographic operations according to the selected techniques, and providing results of the operations to the requesting components. Cryptographic techniques may include cryptographic algorithms (e.g., included in one or more libraries) and/or specific configurations of cryptographic algorithms, as described herein. In some embodiments, the cryptographic agility system is located on the same device as application 110, while in other embodiments the cryptographic agility system is located on a separate device, such as on a server that is accessible over a network.

In certain aspects, crypto provider 120 has two major subsystems, policy manager 130 and library manager 140. Policy manager 130 performs operations related to cryptographic policies, such as receiving policies defined by users and storing information related to the policies in a policy table 132. In an example, a policy 134 is based on one or more of an organizational context 136 and a user context 138 related to a cryptographic request.

Organizational context 136 may involve geographic region (e.g., country, state, city and/or other region), industry mandates (e.g., security requirements of a particular industry, such as related to storage and transmission of medical records), government mandates (e.g., laws and regulations imposed by governmental entities, such as including security requirements), and the like. For instance, policy 134 may indicate that if a cryptographic request is received from a device associated with a particular geographic region, associated with a particular industry, and/or within the jurisdiction of a particular governmental entity, then crypto provider 120 must select a cryptographic technique that meets one or more conditions (e.g., having a particular security rating and/or being configured to protect against particular types of threats) in order to comply with relevant laws, regulations, or mandates.

User context 138 may involve user identity (e.g., a user identifier or category, which may be associated with particular privileges), data characteristics (e.g., whether the data is sensitive, classified, or the like), application characteristics (e.g., whether the application is a business application, an entertainment application, or the like), platform characteristics (e.g., details of an operating system), device characteristics (e.g., hardware configurations and capabilities of the device, resource availability information, and the like), device location (e.g., geographic location information, such as based on a satellite positioning system associated with the device), networking environment (e.g., a type of network to which the device is connected, such as a satellite or land-based network connection), and/or the like. For example, policy 134 may indicate that if a cryptographic request is received from a particular category of user (e.g., administrators, general users, or the like), relating to a particular type of data (e.g., tagged as sensitive or meeting characteristics associated with sensitivity, such as being financial or medical data), associated with a particular application or type of application, associated with a particular platform (e.g., operating system), from a device with particular capabilities or other attributes (e.g., having a certain amount of processing or memory resources, or having an accelerator), and/or from a device in a particular location (e.g., geographic location) or type of networking environment (e.g., cellular network, satellite-based network, land network, or the like), then crypto provider 120 should select a cryptographic technique that meets one or more conditions. In some cases, a policy 134 may relate to resource constraints (e.g., based on available processing, memory, network, physical storage, accelerator, entropy source, or battery resources), such as specifying that cryptographic techniques must be selected based on resource availability (e.g., how much of a device's processing and/or memory resources are currently utilized, how much latency is present on a network, and the like) and/or capabilities (e.g., whether a device is associated with an accelerator) associated with devices and/or networks, while in other embodiments crypto provider 120 selects cryptographic techniques based on resource constraints independently of policy manager 130 (e.g., for all cryptographic requests regardless of whether any policies are in place). For example, policies may only relate to security levels of cryptographic techniques, such as requiring the use of cryptographic techniques associated with particular security ratings when certain characteristics are indicated in contextual information related to a cryptographic request, and resource constraints may be considered separately from policies. In one example, once all cryptographic techniques meeting the security requirements for a cryptographic request are identified based on policies, a cryptographic technique is selected from these policy-compliant cryptographic techniques based on resource constraints.

It is noted that resource constraints and/or capabilities may include a variety of different types of information, such as processor availability and/or capabilities (e.g., clock rate, number of cores, instruction-level features such as single instruction multiple data (SIMD) instructions, and/or the like) memory availability and/or capabilities (e.g., memory size and performance), accelerator capabilities (e.g., hardware-based cryptographic accelerator units available for use with the device), battery capabilities (e.g., lifetime, current power remaining, and/or the like), information about entropy (e.g., how much entropy is available for random numbers, whether available entropy sources are federal information processing standards (FIPS) compliant, and/or the like), network connectivity information (e.g., bandwidth, loss metrics for the channel, congestion, latency, and/or the like), information about the device's physical exposure to potential side-channel attacks and/or ease of side channel analysis, and/or the like. Thus, any of these types of data points may be gathered from devices and/or networks, and may be used in selecting cryptographic techniques (e.g., based on policies and/or tags related to these data points associated with cryptographic techniques).

Policy table 132 stores information related to policies, such as policy 134. In some embodiments, policy table 132 maps various contextual conditions (e.g., relating to organizational context 136 and/or user context 138) to cryptographic technique characteristics (e.g., security ratings, threats protected against, resource utilization ratings, and the like). For example, a contextual condition may be the use of a certain type of application, a certain type of data, or a particular geographic location. A cryptographic technique characteristic may be, for example, a security rating (e.g., 0-10), whether the cryptographic technique is quantum-safe, what level of resource requirements the cryptographic technique has for a particular type of resource (e.g., memory, processor, or network resources), or the like. Thus, when cryptographic requests are received, policy table 132 is used to determine whether the cryptographic requests are associated with any characteristics included in policies and, if so, what cryptographic technique characteristics are required by the policies for servicing the requests.

Library manager 140 generally manages cryptographic libraries containing cryptographic algorithms. For example crypto libraries 144 and 146 each include various cryptographic algorithms, each of which may include configurable parameters, such as key size or ciphertext size. For instance, cryptographic techniques (e.g., algorithms and/or specific configurations of algorithms) may be registered with library manager 140 along with information indicating characteristics of the cryptographic techniques. Examples of algorithms include data encryption standard (DES), triple DES, advanced encryption standard (AES), and Rivest-Shamir-Adleman (RSA). An algorithm may, for example, involve symmetric key encryption or asymmetric key encryption. A configuration of an algorithm may include values for one or more configurable parameters of the algorithm, such as key size, size of lattice, which elliptic curve is utilized, number of bits of security, whether accelerators are used, ciphertext size, and/or the like. A characteristic of a cryptographic technique may be, for example, a security rating, a resource requirement rating, whether the technique requires an accelerator, whether the technique is quantum-safe, or the like. A cryptographic technique may include more than one cryptographic algorithm and/or configuration. In an example, each cryptographic technique is tagged (e.g., by an administrator) based on characteristics of the technique, such as with a security rating, an indication of threats protected against by the technique, indications of the resource requirements of the technique, and/or the like.

Information related to cryptographic techniques registered with library manager 140 is stored in available algorithm/configuration table 142. For instance, available algorithm/configuration table 142 may store identifying information of each available cryptographic technique (e.g., an identifier of a library, an identifier of an algorithm in the library, and/or one or more configuration values for the algorithm) associated with tags indicating characteristics of the technique. It is noted that policies and tags are examples of how cryptographic techniques may be associated with indications of characteristics, and alternative implementations are possible. For instance, rather than associating individual cryptographic techniques with tags, alternative embodiments may involve associating higher-level types of cryptographic techniques with tags, and associating individual cryptographic techniques with indications of types. For example, a higher-level type of cryptographic technique may be "symmetric key encryption algorithms configured with a key size of 200 bits or larger." Thus, if tags are associated with this type (e.g., including security ratings, recourse requirement ratings, and the like), any specific cryptographic techniques of this type (being symmetric key encryption algorithms, and being configured with a key size of 200 bits or more) will be considered to be associated with these tags. In another example, fuzzy logic and/or machine learning techniques may be employed, such as based on historical cryptographic data indicating which cryptographic techniques were utilized for cryptographic requests having particular characteristics.

By allowing cryptographic techniques and libraries to be registered and deregistered with library manager 140 on an ongoing basis, embodiments of the present disclosure allow the pool of possible cryptographic techniques to be continuously updated to meet new conditions and threats. For example, as new libraries are developed, these libraries may be added to library manager 140, and the cryptographic techniques in the library may be used by crypto provider 120 in servicing requests from application 110 without application 110 having any awareness of the new libraries. Similarly, by managing policies and libraries separately, policies may be defined in an abstract manner (e.g., based on characteristics of requests and cryptographic techniques) such that policies may be satisfied through the selection of new cryptographic techniques that were not known at the time of policy creation.

In one particular example, a new cryptographic technique is tagged as quantum safe, meaning that the cryptographic technique was developed to be resistant to being decoded by quantum computers. For instance, the new cryptographic technique may have a high security rating (e.g., 10 out of 10) as well as high resource requirements. The new cryptographic technique is registered with library manager 140, and information about the new cryptographic technique and its characteristics is stored in available algorithm/configuration table 142. Thus, the new cryptographic algorithm is available to be selected by crypto provider 120 for servicing cryptographic requests from application 110.

Continuing with the example, a policy 134 states that cryptographic requests relating to data that is long-lived (e.g., of a type that must be protected over a long amount of time, such as many years) is to be encrypted using a quantum-safe cryptographic technique if such a technique is available, unless device and/or network resource constraints prohibit the use of such a technique. Long-lived data may include, for example, classified government data, certain types of personally-identifiable information, and the like. Data that is not long-lived may include, for example, a code or password that expires after a short amount of time, a credit card number that is updated at regular intervals, network configuration data that changes on a regular basis, and the like.

Thus, when application 110 submits a cryptographic request (e.g., via a call to a generic cryptographic function provided by abstracted crypto API 112) to encrypt an item of long-lived data, crypto provider 120 determines based on information stored in policy table 132 that a quantum-safe cryptographic technique is to be used if possible. Crypto provider 120 determines based on information in available algorithm/configuration table 142 that the new cryptographic technique is quantum-safe. Next, crypto provider 120 analyzes resource constraints related to the cryptographic request to determine if the new cryptographic technique can be performed. If crypto provider 120 determines that the device and/or network associated with application 110 can support the new cryptographic technique (e.g., based on available resources), then crypto provider 120 selects the new cryptographic technique for servicing the cryptographic request, and provides a response to application 110 (e.g., via agility shim 114) accordingly. Dynamic selection of cryptographic techniques based on resource constraints is described in more detail below with respect to FIGS. 2-5. In some cases, the response sent from crypto provider 120 to application 110 includes data encrypted using the selected technique. In other cases, the response includes information related to performing the selected technique to encrypt the data, and the encryption is performed on the device from which the request was sent.

In some cases, more than one cryptographic technique may be selected for servicing a given cryptographic request.

For instance, an item of data may first be encrypted using a first technique (e.g., that satisfies one or more first conditions related to policy and/or resource considerations) and then the encrypted data may be encrypted again using a second technique (e.g., that satisfies one or more second conditions related to policy and/or resource considerations).

Figure 2:
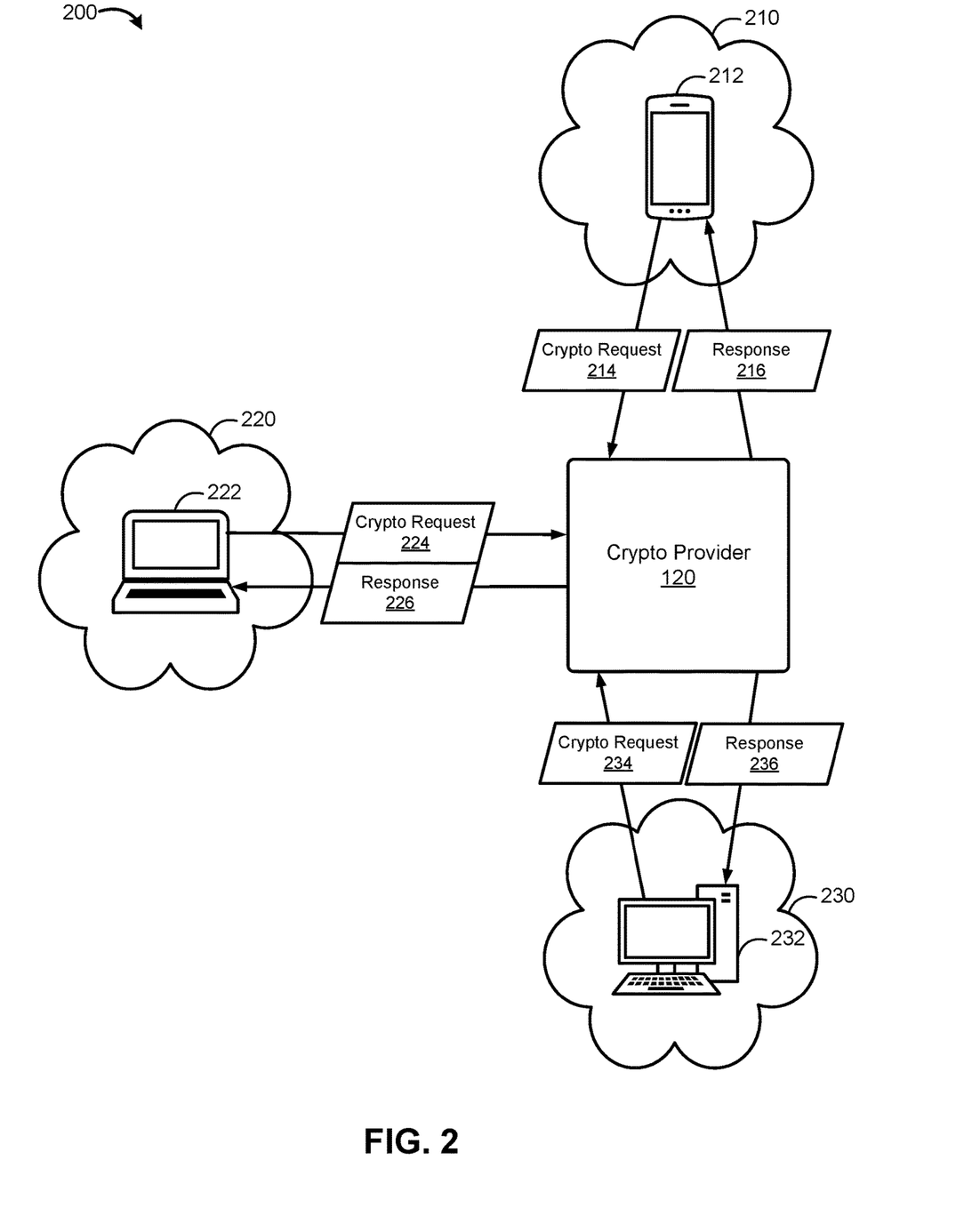
FIG. 2 is an illustration of examples related to dynamic cryptographic technique selection based on network and resource constraints.

FIG. 2 is an illustration 200 of examples related to dynamic cryptographic technique selection based on network and resource constraints. Illustration 200 includes crypto provider 120 of FIG. 1.

Devices 212, 222, and 232 are located, respectively, in networks 210, 220, and 230. Each of devices 212, 222, and 232 runs an application that relies on cryptographic functionality, such as application 110 of FIG. 1. The applications running on devices 212, 222, and 232 may request cryptographic operations by calling generic cryptographic functions, and the function calls may be redirected by an agility shim, such as agility shim 114 of FIG. 1, to crypto provider 120. Crypto provider 120 may be located on a server that is accessible from networks 210, 220, and 230.

In a first example, device 212 is a mobile phone that is located in a satellite-based network 210. Device 212 sends a crypto request 214 to crypto provider 120, such as to encrypt an email related to a transaction (e.g., that may include sensitive information). Crypto provider 120 determines whether there are any policies applicable to crypto request 214, such as based on whether any contextual information related crypto request 214 corresponds to a policy. If any policies apply, crypto provider 120 will ensure that any cryptographic techniques selected comply with the applicable policies.

According to embodiments of the present disclosure, crypto provider 120 selects a cryptographic technique based on resource constraints related to device 212 and/or network 210. For instance, crypto provider 120 may gather performance metrics indicating one or more of current and/or historic processor and memory availability on device 212, and/or information about capabilities of device 212 (e.g., total amount of processing and memory resources, whether device 212 supports accelerator functionality, whether device 212 supports particular types of cryptographic techniques, processing speed of device 212, and/or the like). Furthermore, in some embodiments, crypto provider 120 may gather information about network 210, such as the type of network (e.g., satellite-based, land network, or the like) and/or network performance information (e.g., latency, throughput, packet loss, bandwidth, congestion, and/or the like).

Crypto provider 120 then selects a cryptographic technique for servicing crypto request 214 based on the gathered resource-related information. For instance, upon determining that network 210 is a satellite-based network and/or that network 210 has a high latency, crypto provider 120 may select a cryptographic technique with a low network resource utilization rating. Similarly, upon determining that device 212 has a low processing speed and/or a low amount of current processor availability, crypto provider 120 may select a cryptographic technique with a low processing resource utilization rating. Furthermore, upon determining that device 212 has a low amount of memory availability and/or a low amount of total memory capacity, crypto provider 120 may select a cryptographic technique that has a low memory resource utilization rating. In another example, upon determining that device 212 does not support accelerator functionality, crypto provider 120 may select a cryptographic technique that does not require accelerator functionality.

As described in more detail below with respect to FIG. 3, crypto provider 120 may select a cryptographic technique based on tags associated with the cryptographic technique indicating the resource requirements of the cryptographic technique. As described in more detail below with respect to FIG. 4, crypto provider 120 may first determine which potential cryptographic techniques comply with applicable policies (e.g., meeting a required security rating), and may then determine which of those policy-compliant techniques are consistent with the resource constraints of device 212 and/or network 210. Finally, crypto provider 120 may select a cryptographic technique from a subset of available cryptographic techniques that includes those techniques that are both policy-compliant and resource-compliant. For example, crypto provider 120 may select the most secure cryptographic technique in the set of policy-compliant and resource-compliant techniques.

Crypto provider 120 then provides a response 216 to device 212 based on the selected cryptographic technique, such as including data that has been encrypted using the selected cryptographic technique or information about the selected encrypted technique that device 212 can use to encrypt the data.

In another example, device 222 may be a laptop computer located on high-speed land network 220. Device 222 sends a crypto request 224 to crypto provider 120. Crypto provider 120 determines resource constraints related to device 222 and network 220. For example, because device 222 is a laptop rather than a mobile device, it may have fewer resource constraints than device 212, such as more available processing and memory resources and greater capabilities. Similarly, network 220, being a land network rather than a satellite-based network, may have lower latency than network 210. As such, crypto provider 120 may be able to select higher-security cryptographic techniques for servicing crypto request 224 than for servicing crypto request 214. Crypto provider 120 selects a cryptographic technique based on the resource constraints of device 222 and/or network 220, and provides a response 226 to device 222 accordingly.

In another example, device 232 may be a desktop computer located on a public network 120 in a geographic location remote from crypto provider 120, such as in a foreign country. Device 232 sends a crypto request 234 to crypto provider 120. Crypto provider 120 determines resource constraints related to device 232 and network 230. For example, because device 232 is a desktop computer rather than a laptop or mobile device, it may have fewer resource constraints than devices 212 and 222, such as more available processing and memory resources and greater capabilities. Network 230, being located in a remote geographic location from crypto provider 120, may have higher latency than networks 210 and 220. As such, crypto provider 120 may balance the resource constraints of device 232 and network 230 when servicing crypto request 23, such as selecting a cryptographic technique with a high processing resource requirement and a low network resource requirement. Crypto provider 120 selects a cryptographic technique based on the resource constraints of device 232 and/or network 230, and provides a response 236 to device 232 accordingly.

In some embodiments, crypto provider 120 may dynamically change cryptographic techniques used to service crypto requests 214, 224, and 234 over time as resource constraints change and/or as new cryptographic techniques become available. For instance if processor availability on device 232 significantly decreases, crypto provider 120 may change a cryptographic technique used to service requests from device 232 to a technique that has a lower processing resource requirement. In another example, if device 212 moves from network 210 (e.g., a high-latency satellite-based network) to network 220 (e.g., a lower-latency land network), crypto provider 120 may change a cryptographic technique used to service requests from device 212 to a higher-security technique with a higher network resource requirement. In another example, if a new cryptographic technique is registered that has a higher level of security and still meets all other policy and resource constraints for a given cryptographic request, crypto provider 120 may switch to the new cryptographic technique for servicing the given cryptographic request. Thus, crypto provider 120 may adapt cryptographic techniques over time in a dynamic fashion based on changing circumstances.

Figure 3:
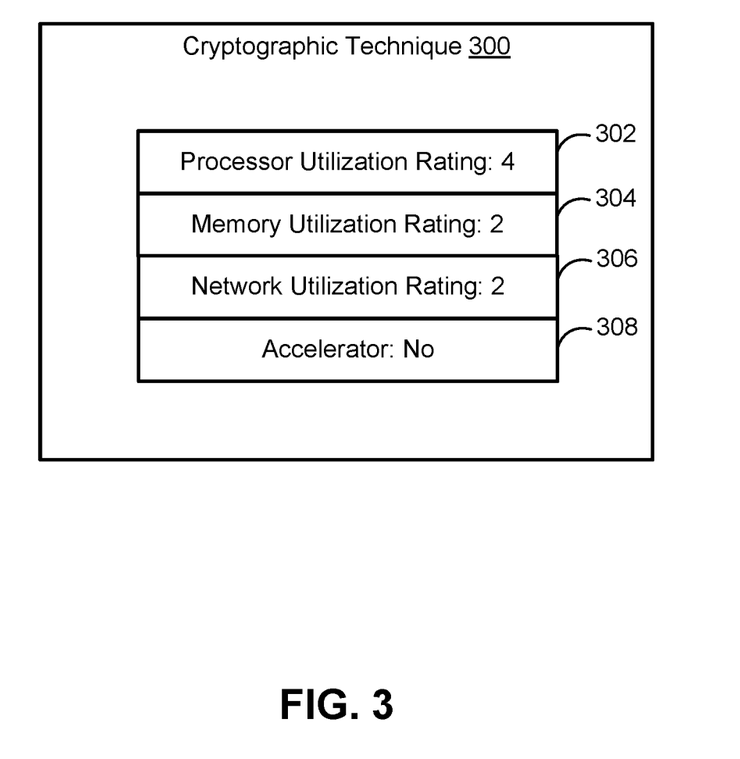
FIG. 3 depicts an example of tagging cryptographic techniques based on resource requirements.

FIG. 3 depicts an example of tagging cryptographic techniques based on resource requirements.

A cryptographic technique 300 comprises one or more cryptographic algorithms and/or configurations of algorithms. For instance cryptographic technique 300 may be included in a cryptographic library, and may be registered with library manager 140 of FIG. 1 as an available cryptographic technique for use in a cryptographic agility system.

Tags 302, 304, 306, and 308 are associated with cryptographic technique 300 to indicate characteristics of cryptographic technique 300, particularly with respect to resource requirements of cryptographic technique 300. For example, these tags may be added by an administrator at the time cryptographic technique 300 is registered with library manager 140 of FIG. 1. While not depicted, cryptographic technique 300 may also be associated with other tags related to, for example, a security level of cryptographic technique 300, threats protected against by cryptographic technique 300, whether cryptographic technique 300 is quantum-safe, and/or the like.

Tags 302, 304, 306, and 308 may be based on a variety of characteristics of cryptographic technique 300, such as key size, size of lattice, which elliptic curve is utilized, number of bits of security, whether accelerators are used, ciphertext size, whether side channel attacks are protected against (e.g., resulting in higher resource usage), and/or the like.

Tag 302 indicates a processor utilization rating of 4. In an example, processor utilization ratings may range from 0-10, and generally indicate an amount of processing resources required by a cryptographic technique.

Tag 304 indicates a memory utilization rating of 2. In an example, memory utilization ratings may range from 0-10, and generally indicate an amount of memory resources required by a cryptographic technique.

Tag 306 indicates a network utilization rating of 2. In an example, network utilization ratings may range from 0-10, and generally indicate an amount of network resources required by a cryptographic technique.

Tag 304 indicates that an accelerator is not used by cryptographic technique 300.

Tags 302, 304, 306, and 308 are included as examples, and other types of tags may be included. Tags 302, 304, 306, and 308 generally allow a cryptographic agility system to identify which cryptographic techniques are best suited for a given cryptographic request based on resource constraints.

Figure 4:
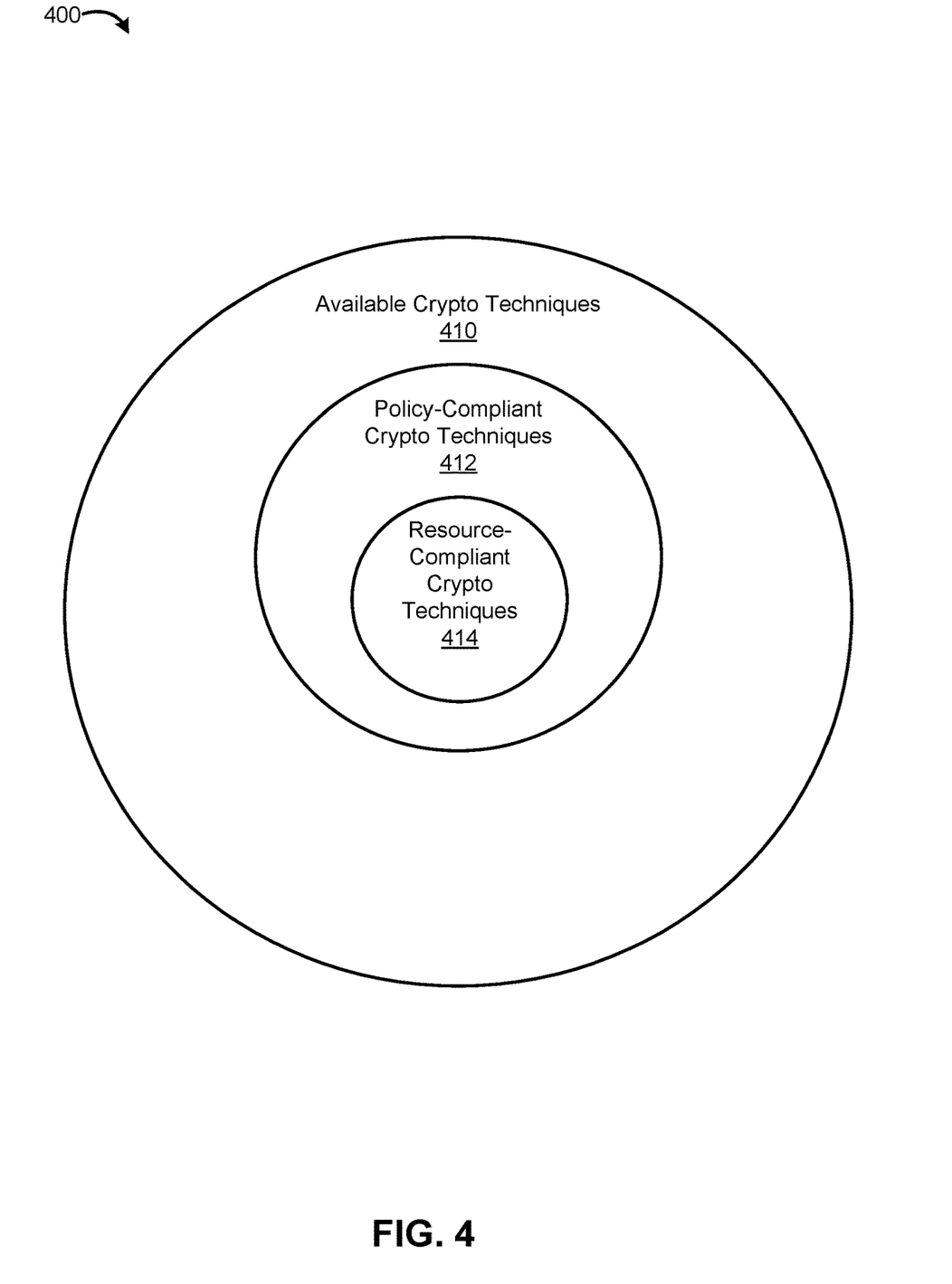
FIG. 4 is a diagram depicting an example related to dynamic cryptographic technique selection based on network and resource constraints.

FIG. 4 is a diagram 400 depicting an example related to dynamic cryptographic technique selection based on network and resource constraints.

Diagram 400 depicts a set of available crypto techniques 410. Available crypto techniques 410 includes all cryptographic techniques that have been registered with a cryptographic agility system, as described above with respect to FIGS. 1-3.

Within the set of available crypto techniques 410 is a subset including policy-compliant crypto techniques 412. Policy-compliant crypto techniques 412 generally includes all available cryptographic techniques that comply with applicable policies for servicing a given cryptographic request. For example, policy-compliant crypto techniques 412 may include all techniques within available crypto techniques 410 that meet a minimum security rating required by a policy, such as based on contextual information associated with the given cryptographic request.

Within the set of policy-compliant crypto techniques 412 is a subset including resource-compliant crypto techniques 414. Resource-compliant crypto techniques 414 generally include all policy-compliant cryptographic techniques that are consistent with resource constraints related to the given cryptographic request. For instance, resource-compliant crypto techniques 414 may include all techniques within policy-compliant crypto techniques 412 that are compatible with the processing, memory, network, and/or capability constraints associated with the given cryptographic request.

A cryptographic technique may be selected for servicing the given cryptographic request from resource-compliant crypto techniques 414. For instance, the most secure technique in resource-compliant crypto techniques 414 may be selected.

Diagram 400 demonstrates an example hierarchy of compliance with policies and resource constraints. In other embodiments, one or more policies may relate to resource constraints, and so compliance with policies may imply compliance with resource constraints.

Figure 5:
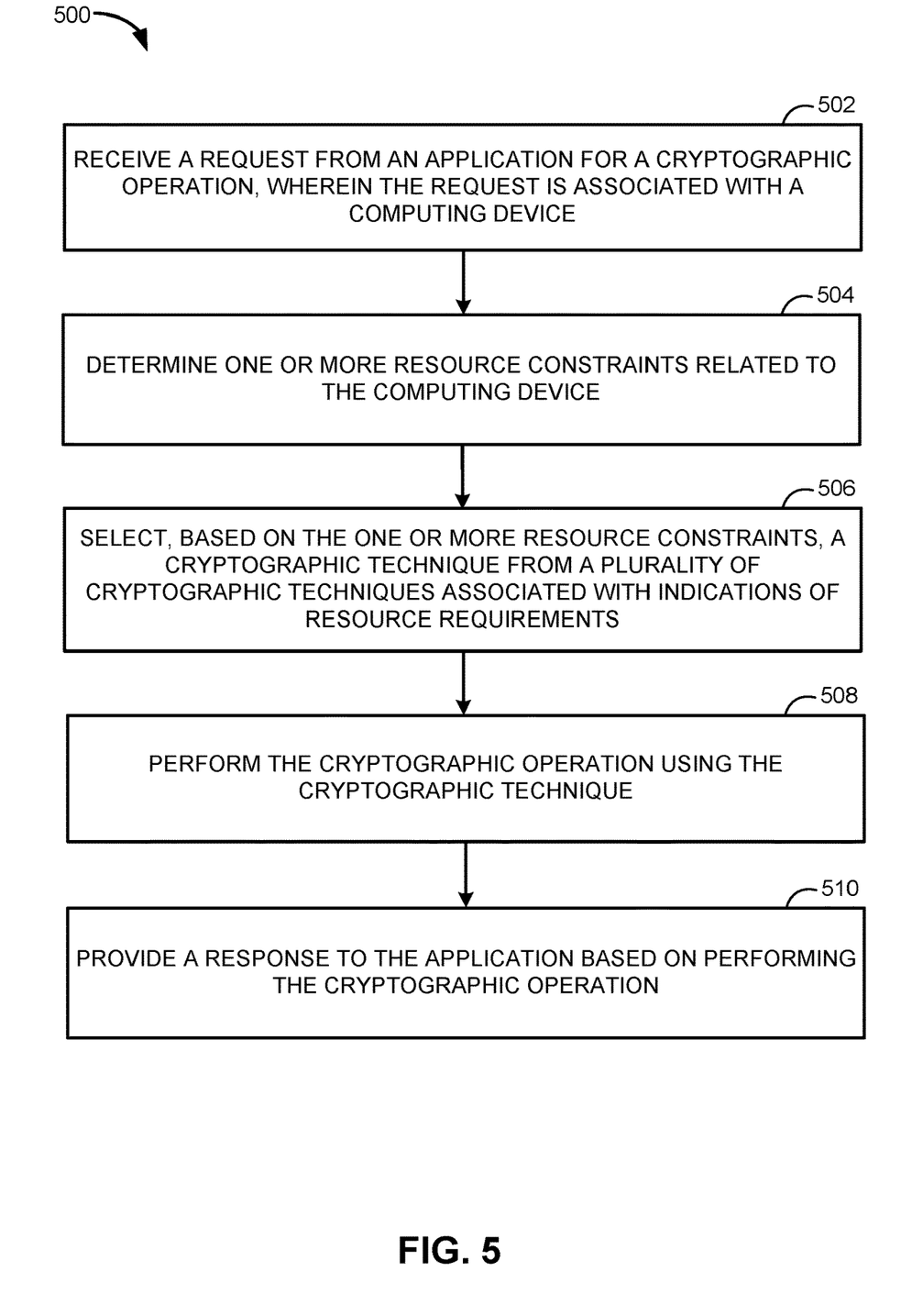
FIG. 5 depicts example operations for dynamic cryptographic technique selection based on network and resource constraints according to embodiments of the present disclosure.

FIG. 5 depicts example operations 500 for dynamic cryptographic technique selection based on network and resource constraints according to embodiments of the present disclosure. For example, operations 500 may be performed by one or more components of the cryptographic agility system described above with respect to FIGS. 1-4.

Operations 500 begin at step 502, with receiving a request from an application for a cryptographic operation, wherein the request is associated with a computing device.

Operations 500 continue at step 504, with determining one or more resource constraints related to the computing device. The one or more resource constraints related to computing the device may comprise one or more hardware resource constraints.

In some embodiments, determining the one or more resource constraints related to the computing device comprises determining one or more of: processor availability on the computing device; memory availability on the computing device; a network performance metric related to the computing device; hardware-based cryptographic acceleration device availability on the computing device; physical storage availability on the computing device; or power availability on the computing device. It is noted that hardware-based cryptographic acceleration device availability may include, for example, processor level advanced instruction sets on the computing device.

Operations 500 continue at step 506, with selecting, based on the one or more resource constraints, a cryptographic technique from a plurality of cryptographic techniques associated with indications of resource requirements. In some cases, selecting the cryptographic technique is further based on one or more performance-related tags associated with the cryptographic technique and/or one or more capabilities of the computing device. The cryptographic technique may be selected from a plurality of candidate cryptographic techniques that comply with one or more policies related to the request. In some cases, the one or more policies indicate a required level of security based on one or more attributes related to the request. In certain embodiments, selecting the cryptographic technique comprises selecting a cryptographic algorithm and one or more configuration parameters related to the cryptographic algorithm. For example, if a resource constraint indicates that the computing device has a low amount of processor availability, then a cryptographic technique comprising a cryptographic algorithm with particular configuration parameters that is associated with a low processor requirement rating may be selected. Thus, the cryptographic algorithm and configuration parameters indicated in a cryptographic technique that has been registered with the cryptographic agility system and that is associated with tags indicating resource and/or security ratings and/or capabilities consistent with policies and/or resource constraints related to the cryptographic request may be selected.

Operations 500 continue at step 508, with performing the cryptographic operation using the cryptographic technique. For example an encryption operation may be performed using the cryptographic technique. In some embodiments, one or more cryptographic libraries are utilized.

Operations continue at step 510, with providing a response to the application based on performing the cryptographic operation.

Some embodiments further comprise switching to an alternative cryptographic technique based on one or more updated resource constraints or capabilities related to the computing device.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization.

The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method, comprising:
receiving, at a cryptographic agility system and from an application, via an application programming interface (API), a request related to a cryptographic operation, wherein the request is associated with a computing device, the request comprising one or more of:
a set of data to be encrypted; or
contextual information related to the request;
determining, with the cryptographic agility system, one or more resource constraints related to the computing device;
selecting, with the cryptographic agility system and based at least in part on the one or more resource constraints, a cryptographic technique from a plurality of cryptographic techniques associated with indications of resource requirements for each of the plurality of cryptographic techniques; and
providing, from the cryptographic agility system and to the application, via the API, a response to the request, the response comprising at least one of:
data encrypted by the selected cryptographic technique; or
information related to performing the selected cryptographic technique to encrypt the data on the computing device.

2. The method of claim 1, wherein the cryptographic agility system and the application run on the computing device.

3. The method of claim 1, wherein determining the one or more resource constraints related to the computing device comprises determining one or more of:
processor availability on the computing device;
memory availability on the computing device;
a network performance metric related to the computing device;
hardware-based cryptographic acceleration device availability on the computing device;
physical storage availability on the computing device; or
power availability on the computing device.

4. The method of claim 1, wherein:
the method further comprises:
allowing the application to interact with the cryptographic agility system without knowledge of the cryptographic agility system;
the API is an abstracted crypto API;
the cryptographic agility system comprises an agility shim that provides the abstracted crypto API; and
receiving the request from the application comprises receiving a call from the application to a generic cryptographic function of the abstracted crypto API to allow the application to interact with the cryptographic agility system without knowledge of the cryptographic agility system.

5. The method of claim 1, wherein selecting the cryptographic technique comprises selecting the cryptographic technique based at least in part on contextual information related to the request, the contextual information comprising one or more of the following:
organizational context, comprising one or more of the following:
a geographic region related to the request;
one or more industry mandates related to the request; or
one or more government mandates related to the request; or
user context, comprising one or more of the following:
an identity of a user related to the request;
one or more characteristics of data related to the request; or
one or more characteristics of the application.

6. The method of claim 1, wherein selecting the cryptographic technique comprises selecting the cryptographic technique based at least in part on compliance of the selected cryptographic technique with one or more policies related to the request.

7. The method of claim 6, wherein the one or more policies indicate a required level of security based on one or more attributes related to the request.

8. The method of claim 1, wherein selecting the cryptographic technique comprises selecting a cryptographic algorithm and one or more configuration parameters related to the cryptographic algorithm.

9. The method of claim 1, further comprising switching to an alternative cryptographic technique based on one or more updated resource constraints or capabilities related to the computing device.

10. A system, comprising:
one or more processors; and
a non-transitory computer-readable medium storing instructions that, when executed by the one or more processors, cause the system to perform operations comprising:
receiving, at a cryptographic agility system and from an application, via an application programming interface (API), a request related to a cryptographic operation, wherein the request is associated with a computing device, the request comprising one or more of:
a set of data to be encrypted; or
contextual information related to the request;
determining, with the cryptographic agility system, one or more resource constraints related to the computing device;
selecting, with the cryptographic agility system and based at least in part on the one or more resource constraints, a cryptographic technique from a plurality of cryptographic techniques associated with indications of resource requirements for each of the plurality of cryptographic techniques; and
providing, from the cryptographic agility system and to the application, via the API, a response to the request, the response comprising at least one of:
data encrypted by the selected cryptographic technique; or
information related to performing the selected cryptographic technique to encrypt the data on the computing device.

11. The system of claim 10, wherein determining the one or more resource constraints related to the computing device comprises determining one or more of:
  processor availability on the computing device;
  memory availability on the computing device;
  a network performance metric related to the computing device;
  hardware-based cryptographic acceleration device availability on the computing device;
  physical storage availability on the computing device; or
  power availability on the computing device.

12. The system of claim 10, wherein:
  the method further comprises:
    allowing the application to interact with the cryptographic agility system without knowledge of the cryptographic agility system;
  the API is an abstracted crypto API;
  the cryptographic agility system comprises an agility shim that provides the abstracted crypto API; and
  receiving the request from the application comprises receiving a call from the application to a generic cryptographic function of the abstracted crypto API to allow the application to interact with the cryptographic agility system without knowledge of the cryptographic agility system.

13. The system of claim 10, wherein selecting the cryptographic technique comprises selecting the cryptographic technique based at least in part on contextual information related to the request, the contextual information comprising one or more of the following:
  organizational context, comprising one or more of the following:
    a geographic region related to the request;
    one or more industry mandates related to the request; or
    one or more government mandates related to the request; or
  user context, comprising one or more of the following:
    an identity of a user related to the request;
    one or more characteristics of data related to the request; or
    one or more characteristics of the application.

14. The system of claim 10, wherein selecting the cryptographic technique comprises selecting the cryptographic technique based at least in part on compliance of the selected cryptographic technique with one or more policies related to the request.

15. The system of claim 14, wherein the one or more policies indicate a required level of security based on one or more attributes related to the request.

16. The system of claim 10, wherein selecting the cryptographic technique comprises selecting a cryptographic algorithm and one or more configuration parameters related to the cryptographic algorithm.

17. A non-transitory computer-readable medium storing instructions that, when executed by one or more processors, cause the one or more processors to perform operations comprising:
  receiving, at a cryptographic agility system and from an application, via an application programming interface (API), a request related to a cryptographic operation, wherein the request is associated with a computing device, the request comprising one or more of:
    a set of data to be encrypted; or
    contextual information related to the request;
  determining, with the cryptographic agility system, one or more resource constraints related to the computing device;
  selecting, with the cryptographic agility system and based at least in part on the one or more resource constraints, a cryptographic technique from a plurality of cryptographic techniques associated with indications of resource requirements for each of the plurality of cryptographic techniques; and
  providing, from the cryptographic agility system and to the application, via the API, a response to the request, the response comprising at least one of:
    data encrypted by the selected cryptographic technique; or
    information related to performing the selected cryptographic technique to encrypt he data on the computing device.

18. The non-transitory computer-readable medium of claim 17, wherein determining the one or more resource constraints related to the computing device comprises determining one or more of:
  processor availability on the computing device;
  memory availability on the computing device;
  a network performance metric related to the computing device;
  hardware-based cryptographic acceleration device availability on the computing device;
  physical storage availability on the computing device; or
  power availability on the computing device.

19. The non-transitory computer-readable medium of claim 17, wherein:
  the method further comprises:
    allowing the application to interact with the cryptographic agility system without knowledge of the cryptographic agility system;
  the API is an abstracted crypto API;
  the cryptographic agility system comprises an agility shim that provides the abstracted crypto API; and
  receiving the request from the application comprises receiving a call from the application to a generic cryptographic function of the abstracted crypto API to allow the application to interact with the cryptographic agility system without knowledge of the cryptographic agility system.

20. The non-transitory computer-readable medium of claim 17, wherein selecting the cryptographic technique comprises selecting the cryptographic technique based at least in part on contextual information related to the request, the contextual information comprising one or more of the following:
  organizational context, comprising one or more of the following:
    a geographic region related to the request;
    one or more industry mandates related to the request; or
    one or more government mandates related to the request; or
  user context, comprising one or more of the following:
    an identity of a user related to the request;
    one or more characteristics of data related to the request; or
    one or more characteristics of the application.

* * * * *